(12) United States Patent
Ramezani et al.

(10) Patent No.: US 10,956,673 B1
(45) Date of Patent: Mar. 23, 2021

(54) METHOD AND SYSTEM FOR IDENTIFYING CITATIONS WITHIN REGULATORY CONTENT

(71) Applicant: MOORE & GASPERECZ GLOBAL INC., Vancouver (CA)

(72) Inventors: Mahdi Ramezani, Vancouver (CA); Elijah Solomon Krag, Vancouver (CA); Amir Abbas Tahmasbi, Vancouver (CA); Margery Moore, Salt Spring Island (CA)

(73) Assignee: MOORE & GASPERECZ GLOBAL INC., Vancouver (CA)

( * ) Notice: Subject to any disclaimer, the term of this patent is extended or adjusted under 35 U.S.C. 154(b) by 0 days.

(21) Appl. No.: 17/017,406

(22) Filed: Sep. 10, 2020

(51) Int. Cl.
*G06F 40/284* (2020.01)
*G06K 9/00* (2006.01)
(Continued)

(52) U.S. Cl.
CPC ....... *G06F 40/284* (2020.01); *G06K 9/00463* (2013.01); *G06K 9/00469* (2013.01);
(Continued)

(58) Field of Classification Search
CPC .............. G06F 40/284; G06K 9/6257; G06K 9/00469; G06K 9/4671; G06K 9/00463; G06K 2209/01
(Continued)

(56) References Cited

U.S. PATENT DOCUMENTS 8,156,010 B2  4/2012  Gopalakrishnan
8,897,563 B1  11/2014 Welling et al.
(Continued)

FOREIGN PATENT DOCUMENTS

CA  2256408 C  12/1997
CA  2381460 A1  2/2001
(Continued)

OTHER PUBLICATIONS

Denk, Timo I. et al., "BERTgrid: Contextualized Embedding for 2D Document Representation and Understanding", 33rd Conference on Neural Information Systems (NeurIPS 2019), Vancouver, Canada, pp. 2-4.
(Continued)

*Primary Examiner* — Charlotte M Baker

(57) ABSTRACT

A computer-implemented system and method for identifying citations within regulatory content is disclosed. The method involves receiving image data representing a format and layout of the regulatory content, receiving a language embedding including a plurality of tokens representing words or characters in the regulatory content, and generating a token mapping associating each of the tokens with a portion of the image data. The method also involves receiving the plurality of tokens and token mapping at an input of a citation classifier, the citation classifier having been trained to generate a classification output for each token based on the language embedding and the token mapping, the classification output identifying a plurality of citation tokens within the plurality of tokens. The method further involves processing the plurality of citation tokens to determine a hierarchical relationship between citation tokens, the hierarchical relationship being established based at least in part on the token mapping for the citation tokens.

17 Claims, 11 Drawing Sheets

(51) Int. Cl.
*G06K 9/46* (2006.01)
*G06K 9/62* (2006.01)

(52) U.S. Cl.
CPC ......... *G06K 9/4671* (2013.01); *G06K 9/6257* (2013.01); *G06K 2209/01* (2013.01)

(58) Field of Classification Search
USPC ........................................................... 704/9
See application file for complete search history.

(56) References Cited

U.S. PATENT DOCUMENTS

| | | | |
|---|---|---|---|
| 10,013,655 B1* | 7/2018 | Clark | G06F 16/382 |
| 10,565,502 B2 | 2/2020 | Scholtes | |
| 2020/0019767 A1 | 1/2020 | Porter et al. | |
| 2020/0233862 A1* | 7/2020 | Shaked | G06F 16/2423 |

FOREIGN PATENT DOCUMENTS

| | | |
|---|---|---|
| CA | 2410881 A1 | 12/2001 |
| CA | 2419377 A1 | 2/2002 |
| CA | 2699397 A1 | 4/2009 |
| CA | 2699644 A1 | 4/2009 |
| CN | 110705223 A | 1/2020 |
| EP | 2993617 A1 | 3/2016 |
| RU | 2628431 C1 | 8/2017 |

OTHER PUBLICATIONS

Locke, Daniel et al., Automatic cited decision retrieval: Working notes of lelab for FIRE Legal Track Precedence Retrieval Task, Queensland University of Technology, 2017, pp. 1-2.

Locke, Daniel et al., Towards Automatically Classifying Case Law Citation Treatment Using Neural Networks. The University of Queensland, Dec. 2019, pp. 1-8.

Sadeghian, Ali et al., "Automatic Semantic Edge Labeling Over Legal Citation Graphs", Springer Science+Business Media B.V., Mar. 1, 2018, pp. 128-144.

Young T. et al., "Recent Trends in Deep Learning Based Natural Language Processing [Review Article]," IEEE Computational Intelligence Magazine, vol. 13, No. 3, pp. 1-32, 2018.

Radford A. et al., "Improving Language Understanding by Generative Pre-Training", pp. 1-12, 2018.

Devlin, J. et al. "BERT: Pre-training of Deep Bidirectional Transformers for Language Understanding", arXiv: Computation and Language, pp. 1-17, 2018.

Lan, Z. et al., "ALBERT: A Lite BERT for Self-Supervised Learning of Language Representations", arXiv: Computation and Language, pp. 1-17, 2019.

Liu, Y. et al., "RoBERTa: A Robustly Optimized Bert Pretraining Approach", arXiv: Computation and Language, pp. 2-13, 2019.

Sanh, V. et al., "DistilBERT, a Distilled Version of BERT: smaller, faster, cheaper and lighter", arXiv: Computation and Language, pp. 1-5, 2019.

Lee, J. et al., "BioBERT: a pre-trained biomedical language representation model for biomedical text mining", Bioinformatics, pp. 1-7, 2019.

Peters, M. E. et al., "To Tune or Not to Tune? Adapting Pretrained Representations to Diverse Tasks", arXiv: Computation and Language, pp. 1-8, 2019.

Siblini, C. et al., "Multilingual Question Answering from Formatted Text applied to Conversational Agents", arXiv: Computation and Language, pp. 1-10, 2019.

Lai, A. et al., "Natural Language Inference from Multiple Premises", arXiv: Computation and Language, pp. 1-10, 2017.

* cited by examiner

METHOD AND SYSTEM FOR IDENTIFYING CITATIONS WITHIN REGULATORY CONTENT

BACKGROUND

1. Field

This disclosure relates generally to processing of text and more particularly to processing text within regulatory content to identify citations.

2. Description of Related Art

Governments at all levels generate documents setting out requirements and/or conditions that should be followed for compliance with the applicable rules and regulations. For example, Governments implement regulations, permits, plans, court ordered decrees, and bylaws to regulate commercial, industrial, and other activities considered to be in the public's interest. Standards bodies, companies, and other organizations may also generate documents setting out conditions for product and process compliance. These documents may be broadly referred to as "regulatory content".

Modern enterprises thus operate under an increasing burden of regulation, which has proliferated exponentially in an attempt by regulatory agencies and other governmental bodies to mitigate potential and actual dangers to the public. Documents setting out regulatory content may vary in size, from one page to several hundred pages. As a result, compliance with regulatory content has become increasingly difficult for enterprises. There remains a need for methods and systems that reduce the burden for enterprises in establishing which regulations and conditions in a body of regulatory content are applicable to their operations.

SUMMARY

In accordance with one disclosed aspect there is provided a computer-implemented method for identifying citations within regulatory content. The method involves receiving image data representing a format and layout of the regulatory content, receiving a language embedding including a plurality of tokens representing words or characters in the regulatory content, and generating a token mapping associating each of the tokens with a portion of the image data. The method also involves receiving the plurality of tokens and token mapping at an input of a citation classifier, the citation classifier having been trained to generate a classification output for each token based on the language embedding and the token mapping, the classification output identifying a plurality of citation tokens within the plurality of tokens. The method further involves processing the plurality of citation tokens to determine a hierarchical relationship between citation tokens, the hierarchical relationship being established based at least in part on the token mapping for the citation tokens.

The method may involve receiving text data representing characters in the regulatory content and generating the language embedding based on the received text data.

Generating the language embedding may involve generating the language embedding using a pretrained language model to process the text data, the pretrained language model being operably configured to generate the plurality of tokens.

Generating the token mapping may involve generating a tensor for each image page of regulatory content, the tensor having first and second dimensions corresponding to the image pixels in the image page and a third dimension in which language embedding values are associated with portions of the image page, the tensor providing the input to the citation classifier.

Generating the language embedding may involve processing the image data to identify regions of interest within the regulatory content, each region of interest including a plurality of characters, and generating the language embedding may involve generating the language embedding only for text data associated with the regions of interest.

Processing the image data to identify the plurality of regions of interest may involve receiving the image data at an input of a region of interest classifier, the region of interest classifier having been trained to identify regions within the image data that are associated with regulatory content that should not be processed to identify citation tokens.

The region of interest classifier may be pre-trained using a plurality of images of portions of the regulatory content that should not be processed to identify citation tokens.

Receiving image data may involve receiving text data including format data representing a layout of the regulatory content and generating an image data representation of the formatted text data.

The image data may involve a plurality of page images and generating the token mapping may involve sizing each of the page images to match a common page size, for each token, establishing a bounding box within the image that identifies a portion of the image corresponding to the token, and determining at least a bounding box location for each token, the bounding box location being indicative of an indentation or position of the token within the applicable page image.

The method may involve processing the portion of the image within the bounding box to determine at least one of a font size associated with the token or a formatting associated with the token, and the citation classifier may be trained to generate the classification output based on at least one of the determined font size or formatting associated with the token.

The citation classifier may include a convolutional neural network.

Processing the plurality of citation tokens may involve receiving pairwise combinations of citation tokens at an input of a sibling classifier, the sibling classifier having been trained to output a probability indicative of whether each pairwise combination of citation tokens have a common hierarchical level.

The method may involve generating a similarity matrix including a plurality of rows corresponding to the plurality of citation tokens and a plurality of columns corresponding to the citation tokens, the similarity matrix being populated with the probabilities determined by the sibling classifier for each pairwise combination of citation tokens, and the method may further involve processing the similarity matrix to generate a hierarchical level for each citation identifier token.

The plurality of identified citation tokens each include either a citation number or citation title, and a remaining plurality of tokens not identified as citation tokens include body text, and the method may further involve associating the body text between two consecutive citation tokens with the citation token.

In accordance with another disclosed aspect there is provided a system for identifying citations within regulatory content. The system includes a token mapper operably configured to receive a language embedding including a plurality of tokens representing words or characters in the regulatory content. The token mapper is operably configured to receive image data representing a format and layout of the regulatory content and generate a token mapping associating each of the tokens with a portion of the image data. The system also includes a citation classifier operably configured to receive the plurality of tokens and token mapping at an input of a citation classifier, the citation classifier having been trained to generate a classification output for each token based on the language embedding and the token mapping, the classification output identifying a plurality of citation tokens within the plurality of tokens. The system further includes a hierarchical relationship classifier operably configured to process the plurality of citation tokens to determine a hierarchical relationship between citation tokens, the hierarchical relationship being established based at least in part on the token mapping for the citation tokens.

The system may include one or more processor circuits having a memory for storing codes, the codes being operable to direct the processor circuit to implement each of the token mapper, the citation classifier, and the hierarchical relationship classifier.

Other aspects and features will become apparent to those ordinarily skilled in the art upon review of the following description of specific disclosed embodiments in conjunction with the accompanying figures.

BRIEF DESCRIPTION OF THE DRAWINGS

In drawings which illustrate disclosed embodiments.

DETAILED DESCRIPTION

Figure 1:
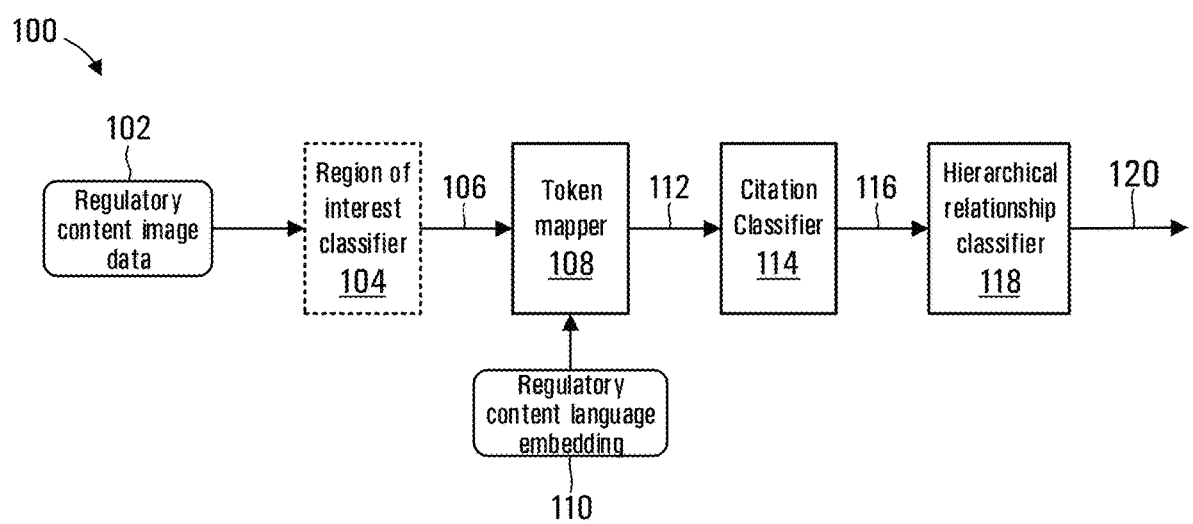
FIG. 1 is a block diagram of a system for identifying citations within regulatory content according to a first disclosed embodiment.

Referring to FIG. 1, a system for identifying citations within regulatory content according to a first disclosed embodiment is shown generally at 100 as a block diagram. In the embodiment shown, the regulatory content is received as image data 102, where the text is represented by pixels rather than digital text. The regulatory content image data 102 represents text within the regulatory content as an image, rather than just serial encoded text. The regulatory content image data 102 thus includes format and layout information associated with the regulatory content. In other embodiments the regulatory content may be received in any of a variety of text formats, where words and characters in the text are encoded into a digital data format representing the text of the regulatory content. Whether in image or digital form, the regulatory content may include formatting and/or a hierarchical document structure that has significance in the understanding of the content.

In this embodiment the system 100 optional includes a region of interest classifier 104 that processes the regulatory content image data 102 to identify regions of interest. The region of interest classifier 104 outputs a region of interest classification 106 The regulatory content may include text regions such as title pages, page headers and footers, etc. that may be excluded from further processing to identify citations.

The system 100 also includes a token mapper 108, which receives the region of interest classification output 106 and a language embedding 110 associated with the regulatory content. The language embedding 110 may be generated using a language model and may output a plurality of tokens representing words or characters in the regulatory content. A token is a sequence of characters grouped together as a useful semantic unit for processing. For example, the word "sleeping" may be represented by a first token "sleep" and a second token "ing". Each token is represented by as set of data generated by the language model that defines the token and its context in the document. Tokenization may be implemented at a word level, sub-word level, and/or character level. In the remainder of this description, the term token will be used to refer to sequences of one or more characters that have been rendered from the original regulatory content. In one embodiment the language model first performs a tokenization of the regulatory content to separate the content into tokens prior to generating the language embedding 110 for the identified tokens.

The token mapper 108 generates a token mapping output 112 that associates each of the tokens with a portion of the image data. In one embodiment the image data 102 may be in the form of a pixel-based image representation. In other embodiments the regulatory content may already be formatted as digital text and may include format data representing a layout of the regulatory content. In this event, the digital text may be converted into a pixel-based image representation to provide the image data 102. The token mapper 108 generates a token mapping output 112, which associates each of the tokens in the language embedding 110 with a portion of the image data 102.

The system 100 also includes a citation classifier 114, which receives the mapping output 112 and generates a classification output 116 for each of the plurality of tokens in the regulatory content. The classification output 116 identifies certain tokens in the plurality of tokens as being "citation tokens". In context of regulatory content, a citation is a reference to one or more requirements or conditions within the text of the regulatory content. In some cases, regulatory content may include explicit alphanumeric citations. In other cases, a citation may not be explicit, and may be inferred based on variations in font size, font type, or its position on a page. The citation classifier 114 may be implemented using a neural network, which has been trained to generate the classification output 116 identifying the citation tokens.

The system 100 further includes a hierarchical relationship classifier 118, which receives the classification output 116. The hierarchical relationship classifier 118 is operably configured to process the identified plurality of citation tokens to determine a hierarchical relationship between these tokens. A hierarchical relationship may be established based at least in part on image data associated with each identified citation token. The hierarchical relationship classifier 118 generates a citation hierarchy output 120 representing a hierarchical structure of the identified citation tokens.

Figure 2:
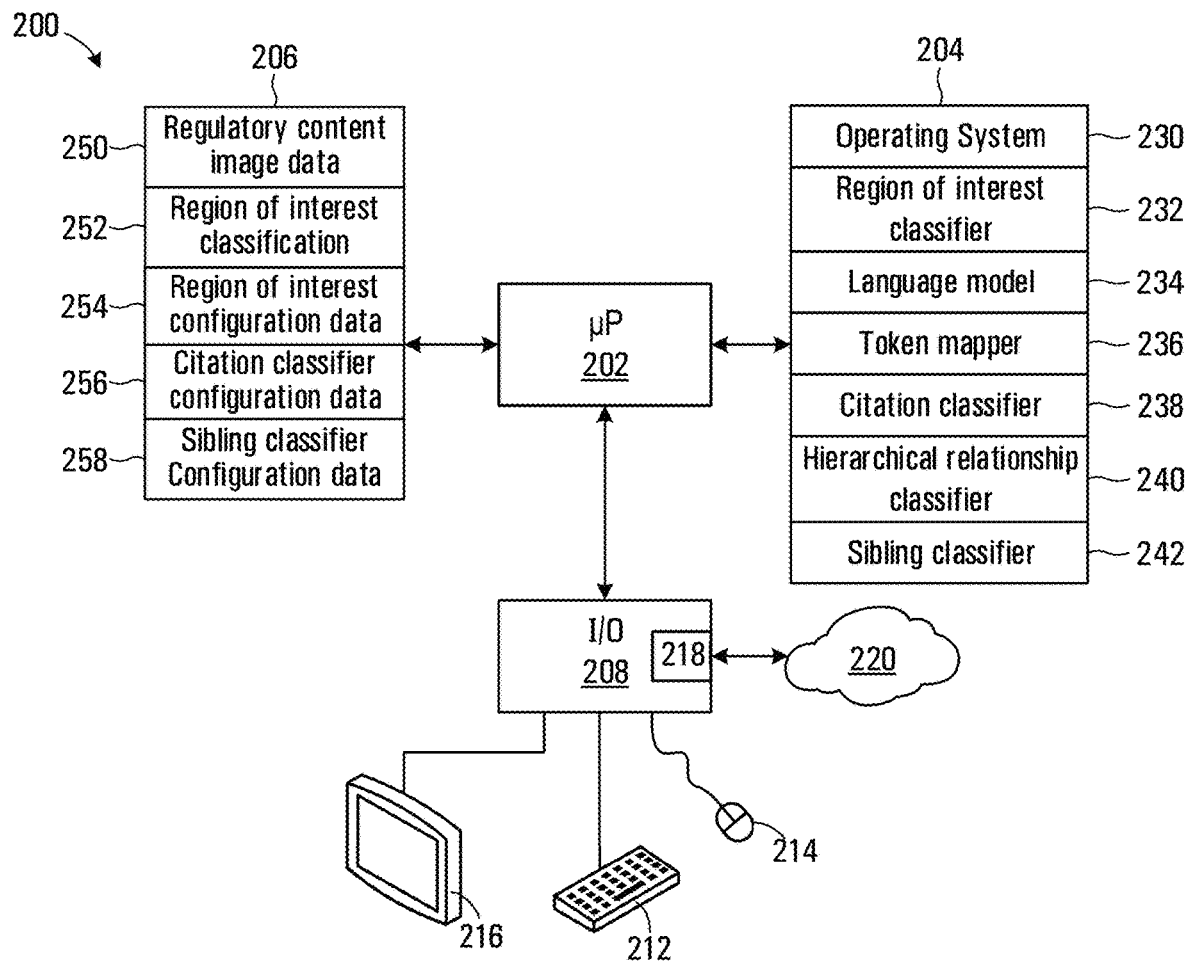
FIG. 2 is a block diagram of an inference processor circuit for implementing the system shown in FIG. 1.

The system 100 for identifying citations shown in FIG. 1 may be implemented on a processor circuit, operably configured to provide inference functions for processing regulatory content. Referring to FIG. 2, an inference processor circuit is shown generally at 200. The inference processor circuit 200 includes a microprocessor 202, a program memory 204, a data storage memory 206, and an input output port (I/O) 208, all of which are in communication with the microprocessor 202. Program codes for directing the microprocessor 202 to carry out various functions are stored in the program memory 204, which may be implemented as a random access memory (RAM), flash memory, a hard disk drive (HDD), or a combination thereof. The program memory 204 includes storage for program codes that are executable by the microprocessor 202 to provide functionality for implementing the various elements of the system 100.

In this embodiment, the program memory 204 includes storage for program codes 230 for directing the microprocessor 202 to perform operating system functions. The operating system may be any of a number of available operating systems including, but not limited to, Linux, macOS, Windows, Android, and JavaScript. The program memory 204 also includes storage for program codes 232 for implementing a region of interest classifier, codes 234 for implementing a language model, codes 236 for implementing the token mapper 108, codes 238 for implementing the citation classifier 114, codes 240 for implementing the hierarchical relationship classifier 118, and codes 242 for implementing a sibling classifier.

The I/O 208 provides an interface for receiving input via a keyboard 212, pointing device 214. The I/O 208 also includes an interface for generating output on a display 216. The I/O 208 also includes an interface 218 for connecting the processor circuit 200 to a wide area network 220, such as the internet.

The data storage memory 206 may be implemented in RAM memory, flash memory, a hard drive, a solid state drive, or a combination thereof. Alternatively, or additionally the data storage memory 206 may be implemented at least in part as storage accessible via the interface 218 and wide area network 220. In the embodiment shown, the data storage memory 206 provides storage 250 for regulatory content image data 102, storage 252 for region of interest classification data, storage 254 for configuring a region of interest classifier, storage 256 for citation classifier configuration data, storage 252 for configuring a sibling classifier, and storage 260 for processed citation data.

The inference processor circuit 200, when configured with the applicable neural network training and configuration data in storage locations 254-258 of the data storage memory 206, is operable to implement the system 100 for processing regulatory content shown in FIG. 1.

Figure 3:
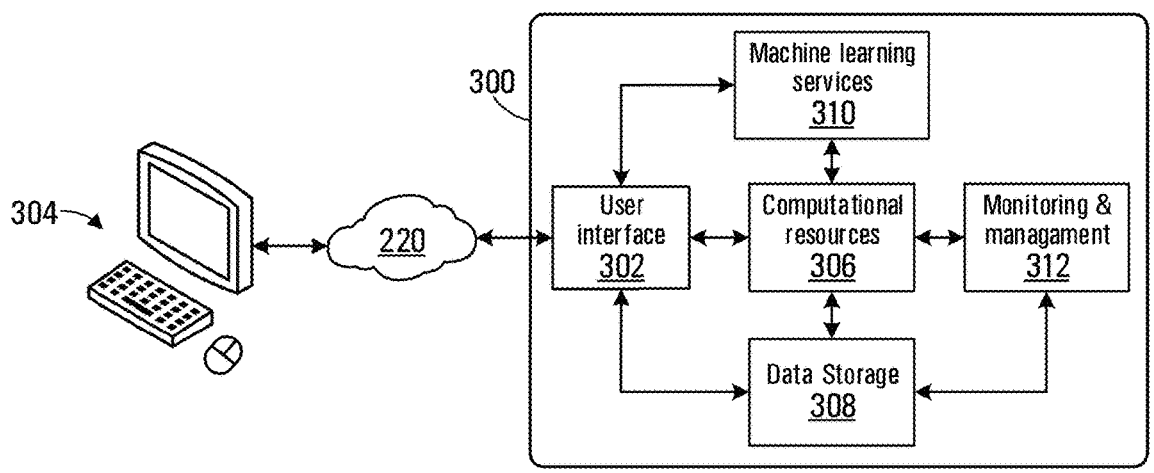
FIG. 3 is an example of a processor circuit based system for training neural network portions of the system shown in FIG. 1.

Processes for generating the necessary neural network training and configuration data for implementing the system 100 are described below. While the training may be performed on the inference processor circuit 200, in practice neural network configuration and training may be performed on specifically configured training system such as a machine learning computing platform or cloud-based computing system, which typically include one or more graphics processing units. An example of a training system is shown in FIG. 3 at 300. The training system 300 includes a user interface 302 that may be accessed via an operator's terminal 304. The operator's terminal 304 may be a processor circuit such as shown at 200 in FIG. 3 that has a connection to the wide area network 220. The operator is able to access computational resources 306 and data storage resources 308 made available in the training system 300 via the user interface 302. In some embodiments, providers of cloud based neural network training systems 300 may make machine learning services 310 that provide a library of functions that may be implemented on the computational resources 306 for performing machine learning functions such as training. For example, a neural network programming environment TensorFlow™ is made available by Google Inc. TensorFlow provides a library of functions and neural network configurations that can be used to configure the above described neural network. The training system 300 also implements monitoring and management functions that monitor and manage performance of the computational resources 306 and the data storage 308. In other embodiments, the functions provided by the training system 300 may be implemented on a stand-alone computing platform configured to provide the computing resources necessary for performing the training.

Generally, the training of the neural networks for implementing the citation classifier 114, hierarchical relationship classifier 118 are performed under supervision of an operator using the training system 300. The operator will typically configure the neural networks and provide labeled training data to generate weights and biases for the neural network. During the training exercise, the operator may make changes to the configuration of the neural network until a satisfactory accuracy and performance is achieved. The resulting neural network configuration and determined weights and biases may then be saved to the applicable locations 254-258 of the data storage memory 206 of the inference processor circuit 200. As such, the citation classifier 114, hierarchical relationship classifier 118 and other neural network functions described herein may be initially implemented and refined on the system 300, before being configured for regular use on the inference processor circuit 200.

Regulatory content documents, in addition to significant regulatory text, may include redundant or superfluous text such as cover pages, a table of contents, a table of figures, page headers, page footers, page numbering etc. The region of interest classifier 104 performs preprocessing operations to identify significant regulatory text on each page of the regulatory content. One advantage of removing redundant text is to reduce subsequent processing time within the token mapper 108 and citation classifier 114. The removal of redundant text also avoids identification of citations within the redundant text, which may cause redundant identifications of citations. As an example, in some cases regulatory content documentation may have headers or footers on each page that list the citations appearing on the page. Identification and processing of these citations may result in an incorrect hierarchical relationship output by the hierarchical relationship classifier 118. A similar problem may exist with listings of citations in a table of contents of the document. Avoiding the processing of these redundant text regions provides for a more robust extraction of significant citations from the regulatory content.

In one embodiment the region of interest classifier 104 may be implemented using a deep convolutional neural network, which is trained to generate the region of interest configuration data for storage in the location 254 of data storage memory 206 on the inference processor circuit 200. The training may be performed on the training system 300, on which a region of interest classifier neural network has been configured. In one embodiment a Faster R-CNN network architecture is used to implement the region of interest classifier 104. Image data 102 representing the pages of regulatory content may be input to the region of interest classifier 104 as input tensors having image height and image width dimensions corresponding to the pixels of the image data and for color documents, a depth dimension. The depth dimension may be associated with color information such RGB color data, for example. In one embodiment the image data 102 may be converted from color images into a grey-scale images, to expedite training of the neural network on the system 300 and subsequent inference by the processor circuit 200.

Figure 4A:
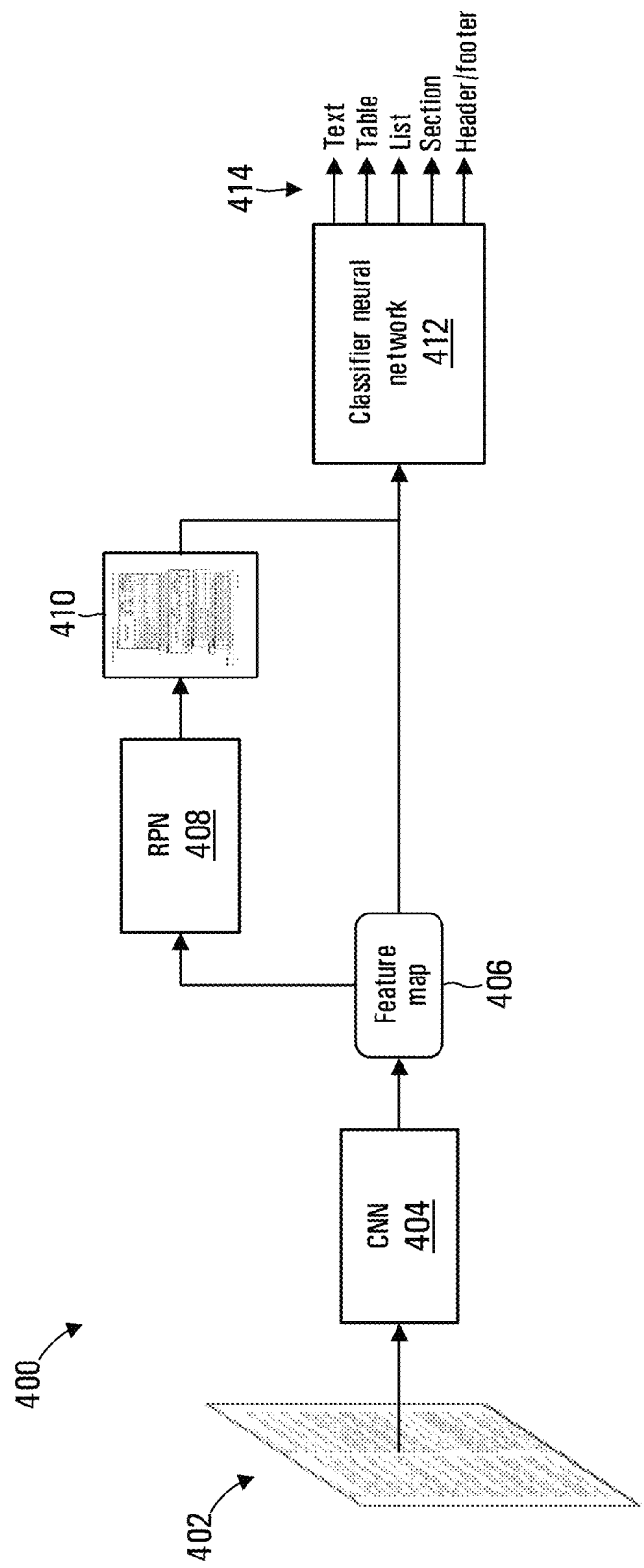
FIG. 4A is a block diagram of an implementation of a region of interest classifier neural network used in the system shown in FIG. 1.

Referring to FIG. 4A, an implementation of a faster R-CNN network is shown as a block diagram at 400. The input tensors 402 may be fed into a pre-trained convolutional neural network (CNN) 404 such as ResNet-101 network. ResNet-101 is available in a configuration that has been pre-trained on more than a million images from the ImageNet database. The tensor input 402 is processed in the ResNet-101 up to an intermediate layer (for example, the second last layer) to provide a convolutional feature map 406. The convolutional feature map 406 is used as a feature extractor for a subsequent step, in which the feature map is processed through a region proposal network (RPN) 408. The RPN 408 generates bounding box coordinates for regions of interest within the image 410. The bounding box coordinates are then fed to a final classifier neural network stage, in which several fully connected layers generate classification labels 414 for the bounding boxes, such as "text", "table", "list", "section", "header/footer", etc. and perform bounding-box regression.

Figure 4B:
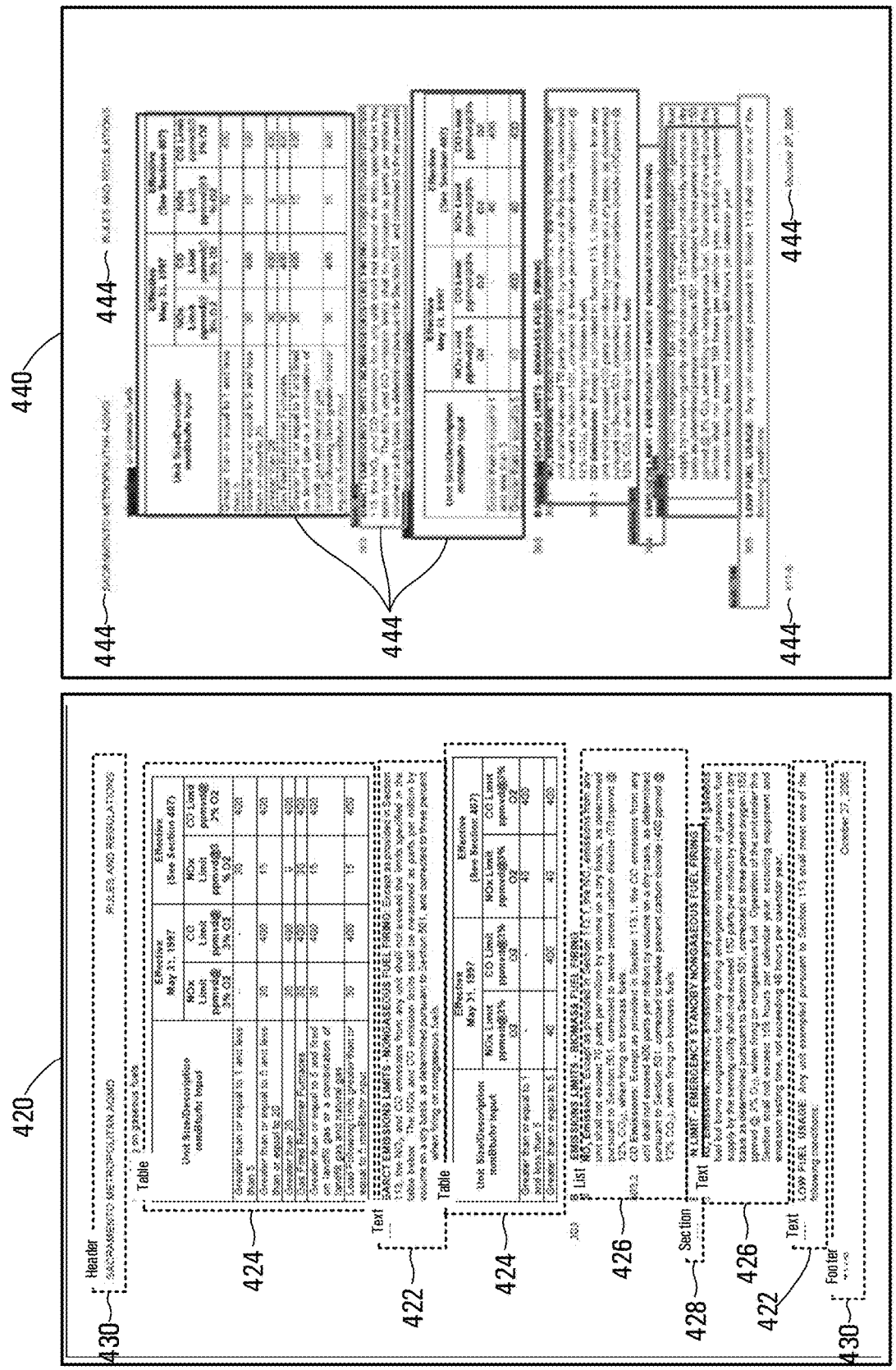
FIG. 4B is a representation of a labeled page image for training the region of interest classifier neural network of FIG. 4A and a representation of a page image after processing by the trained neural network.

Training of the faster R-CNN neural network is based on a set of training images of regulatory content pages, which are selected and manually labeled with classifications such as text, table, list, section, etc. An example of a labeled regulatory content image page is shown in FIG. 4B at 420. The page image 420 includes various regions, which are shown identified by broken lines, each identified region including an assigned label. The page image 420 includes regulatory text identified as regions of interest, in this embodiment as "text" (regions 422), "table" (regions 424), "list" (regions 426), and "section" (region 428).

The page image 420 also includes header and footer text regions 430, which are not regions of interest, but are output as classifications by the neural network 400 to facilitate exclusion from further processing by the system 100. Other pages may be selected that include other regions that may be classified, such as a table of contents, or figure description, or title page, for example. These regions may also be excluded from further processing by the system 100. Generally, for successful region of interest identification, it is important to select and label a sufficient number training images to account for different document formats, languages, differing scale, font, etc. A first portion of the labeled training images will be used for training the neural network 400 on the training system 300, while a second portion of the labeled training images will be used for validation, as described below.

Once a set of training images are available and uploaded to the data storage 308, the neural network training exercise is configured by selecting an appropriate number of epochs and other network hyper parameters. Training generally involves seeding the neurons of the neural network with values for the weights $w_{ij}$ and biases $b_j$. The first portion of the labeled training images are then passed through the network to obtain region of interest classification predictions, which are compared to the labels in the training images. A loss function is then evaluated prior to performing backpropagation based on the loss function to all neurons in the neural network. The weights $w_{ij}$ and biases $b_j$ are then updated based on a gradient descent or other optimization function. The described training steps are then repeated until the neural network provides prediction values that are considered to be sufficiently accurate. In order to validate the neural network, the second portion of labeled training images that were not used for training of the network are fed through the neural network. The region of interest classification predictions output by the neural network are then compared against the labels to verify that the trained network is effective in generating predictions for unseen examples. If the neural network is validated, the weights $w_{ij}$ and biases $b_j$ and data defining the network configuration is saved into the store 254 of the data storage memory 206, for use in by the inference processor circuit 200 in processing actual regulatory text.

An example of a processed version of the page 440, which would be generated by the region of interest classifier 104 is shown in FIG. 4 at 440. The processed page 440 includes significant regulatory text identified as regions of interest 442. Text 444 in the page header and footer is not identified as being within any of the regions, which implicitly identifies this text as redundant text. Each of the bounding boxes has a classification label, which in this embodiment also includes an associated level of confidence as a percentage. As an example, the first bounding box 444 is identified as a "table" with an associated confidence level of 93%.

Although the processed page 440 is described here in the context of the training exercise, the region of interest classifier 104 produces a similar output when the trained region of interest neural network is implemented on the inference processor circuit 200. The inference processor circuit 200 may also be configured to convert the actual images of regulatory text into grey-scale images prior to performing the region of interest classification, thus resulting in a faster inference time. Referring back to FIG. 1, the region of interest classification output 106 thus facilitates the removal of redundant text regions 443 and other superfluous text to expedite further processing by the token mapper 108.

In an alternative embodiment, the region of interest classifier 104 may be implemented using a single-stage detector that treats object detection as a simple regression problem based on learning classification probabilities and bounding box coordinates for input images. In this approach, single shot detector (SSD) networks may be implemented. In one embodiment a SSD network may be configured to use a pretrained CNN such as mobilenet to extract features from input images. The extracted features are then passed to SSD layers to output labels and bounding boxes for regions of interest. These steps are carried out in one forward pass through the network which makes the SSD neural network run faster than the more complex faster-R-CNN. In benchmarking tests performed by the inventors, Faster-RCNN was found to be more accurate than SSD in terms of exact bounding box coordinates. However, Faster-RCNN was found to be slower than the SSD neural network.

In some embodiments, the region of interest classifier is not only configured to identify redundant text within the regulatory content, but also to identify tables. In some embodiments, tables may be processed differently to text areas. Generally, removing redundant text does not require high accuracy to detect the exact bounding box of each region, and may be performed quickly. However, recognizing different type of tables requires that the image data be processed at high resolution, and using a more accurate neural network like Faster R-CNN may yield more accurate results.

Following the training exercise on the training system 300, configuration data is generated and may be stored in the storage location 254 of the data storage memory 206 for directing the microprocessor 202 to implement the trained region of interest classifier 104 on the inference processor circuit 200. The region of interest classification 106 generated by the region of interest classifier 104 is stored in the location 252 of the data storage memory 206, when implemented on the processor circuit 200.

Figure 5:
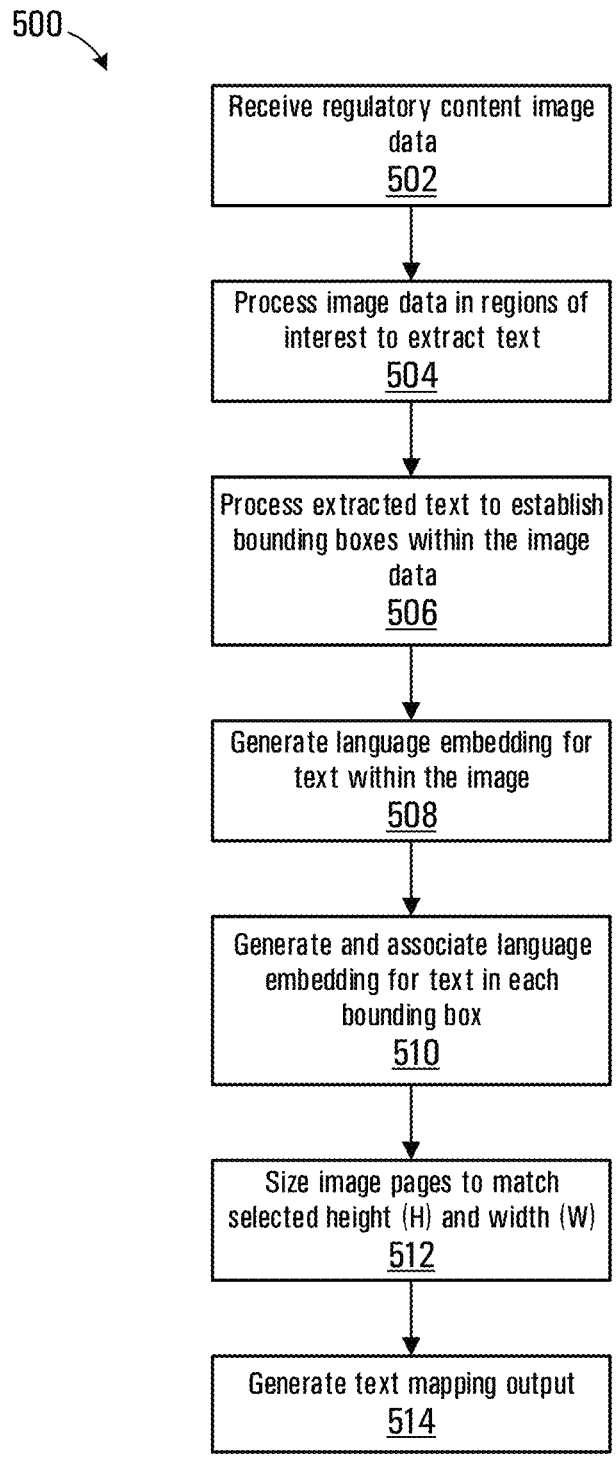
FIG. 5 is a process flowchart depicting blocks of code for directing the processor circuit of FIG. 2 or FIG. 3 to implement a token mapper of the system shown in FIG. 1.

Referring to FIG. 5, a flowchart depicting blocks of code for directing a processor circuit of either the inference processor circuit 200 or the training system 300 to implement the token mapper 108 for processing the region of interest classification output 106 is shown at 500. The blocks generally represent codes for directing the processor circuit 200 to generate the token mapping output 112. The actual code to implement each block may be written in any suitable program language, such as Python, Go programming language, C, C++, C#, Java, and/or assembly code, for example.

The process 500 begins at block 502, which directs the processor circuit to receive regulatory content image data. In the embodiment shown in FIG. 1, the token mapper 108 receives regulatory content image data as region of interest classification output 106, in which portions of the image data 102 that have been classified as being of interest for further processing are identified. In one embodiment the regulatory content image data is received as a plurality of pages, each page having a plurality of pixels representing the identified regulatory content as an image. In one embodiment, the image data each pixel is represented by a greyscale value.

Block 504 then directs the processor circuit to process the image data within the regions of interest to extract text. In the image data received at block 502, the text is not directly accessible and requires further processing to recognize and encode the text into a series of characters and words. In one embodiment the processing may be performed by a machine learning service such as Amazon Textract™. Textract is a service that automatically extracts text and data from document images using advanced forms of optical character recognition (OCR) to identify, understand, and extract text data. Similar OCR services and are available from Google and other providers. For example, Google makes available open source library functions as Tesseract OCR, which has an ability to recognize more than 100 languages.

Figures 6A, 6B:
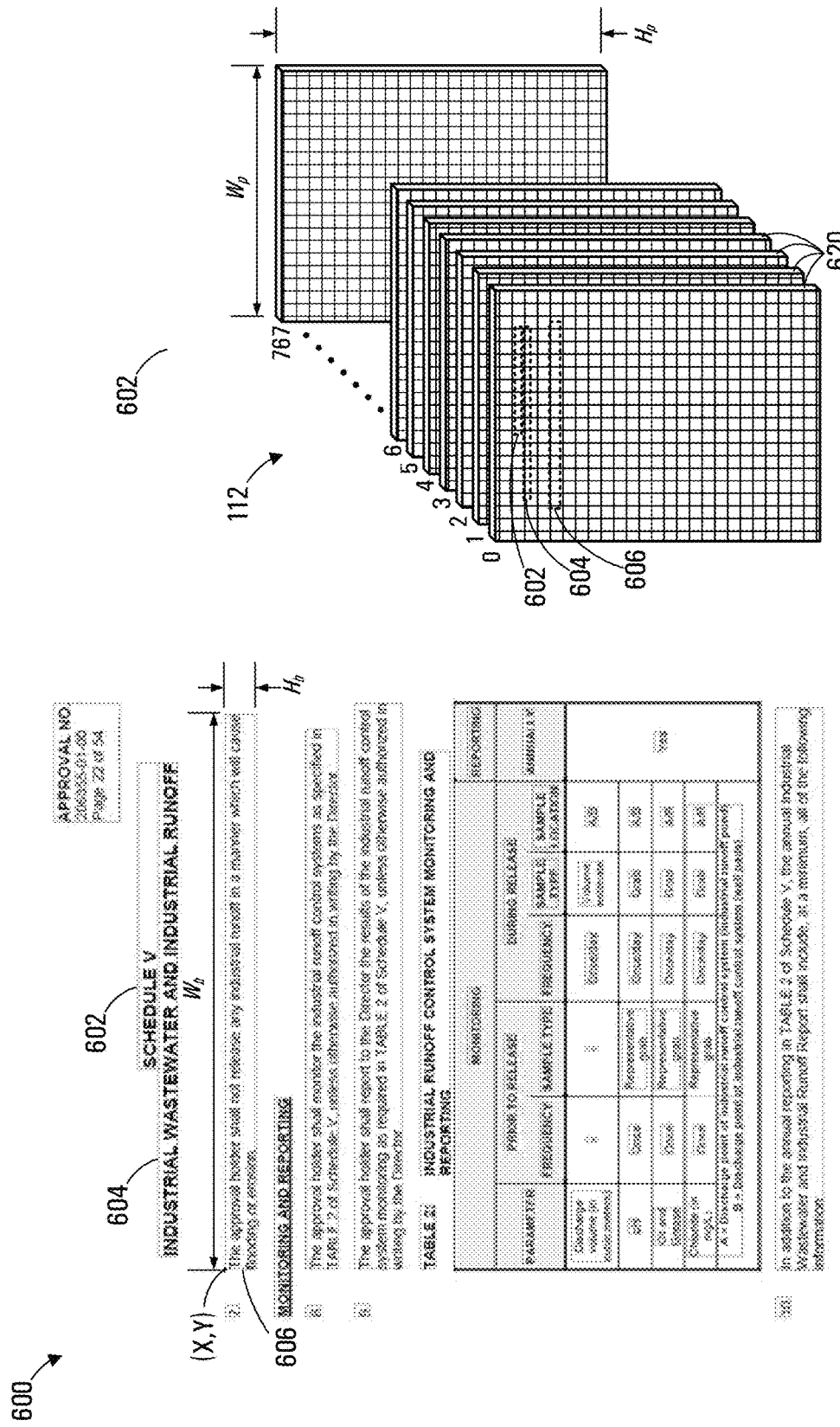
FIG. 6A is an example of a page that has been processed to establish regions of interest portions within a page image.
FIG. 6B is a schematic view of a tensor representing a mapping output generated by a token mapper of the system shown in FIG. 1.

Block 506 then directs the processor circuit to further process the text to establish bounding boxes around the words and characters extracted in block 504. An example of a page that has been processed using Textract is shown in FIG. 6A at 600. A plurality of bounding boxes 602, 604, 606 etc. define locations of portions of text within the page image that have been identified as regions of interest. As an example, the bounding box 606 has bounding box coordinates indicated in FIG. 6A as Height $H_b$, Left X coordinate, Top Y coordinate, and Width $W_b$) that define the position and size of the bounding box for this text on the page. Textract provides a function that outputs these bounding boxes as a ratio with respect to the page image, which can be converted into pixel references within the image data by multiplying the coordinates by the number of pixels representing the page (e.g. 1700×2200 pixels).

In some embodiments, regulatory content documents may already include text data saved within the document. For example, while some Portable Document Format (PDF) documents are only encoded to represent text content as an image, other PDF documents are tagged to also provide the text associated with the content. In this case, it is unnecessary to extract text using OCR. The text content may rather be processed to only generate the bounding boxes 606. As an example, the Unisuite library includes functions for generating the bounding boxes 606 for documents that have accessible text in a similar manner as described above for Textract. Other services are available from providers such as Retsina Software Solutions, who have a Pdf2Text product that provides similar functionality.

The process 500 continues at block 510, which directs the processor circuit to generate language embeddings for the text within each bounding box. A language embedding is essentially a contextual representation of words or phrases using a vector of real numbers. Different words having similar meanings within a particular context will have similar vector representations. Language embeddings may be generated using a language model. For example, the language model may be implemented using a pre-trained language model, such as Google's BERT (Bidirectional Encoder Representations from Transformers) or OpenAI's GPT-3 (Generative Pretrained Transformer). These language models are pre-trained using large multilingual datasets to capture the semantic and syntactic meaning of words in text and may be implemented to generate token data for text in any language that is input to the language model. In one embodiment, the language model may be implemented using BERT. The language model outputs token data in the form of tensors having 768 values for each identified token in the content. The language model may be implemented within a variety of machine learning environments such as Python, and PyTorch, or TensorFlow by invoking library functions. Block 510 causes the processor circuit of either the inference processor circuit 200 or training system 300 to generate a language embedding for each portion of the text or token within the bounding boxes on the page 600.

Block 512 then directs the processor circuit to size each page image to match a selected height and width. If the image pages have size that differs from the fixed height and width, the page is thus resized accordingly. As an example, the image page may be sized to standard letter size of 8.5 inches wide by 11 inches high. For the example of a moderate resolution of 200 pixels per inch, each image page would this have 1700×2200 pixels. Ensuring that each image page has the same scaling facilitates accurate comparison of the tokens in the identified bounding boxes on the basis of font size, or boldness of the font, for example.

Block 514 then directs the processor circuit to generate the mapping output 112. In one embodiment the mapping output 1112 is a tensor representation for each page image. For example, a tensor having a size corresponding to the pixels on the page (i.e. 1700×2200 pixels for the example above) may be generated. In one embodiment the tensor may be represented by a tensor element having dimensions ($W_p$, $H_p$, C), where C is a tensor channel that corresponds to the language embedding 110. A representation of the tensor mapping output 112 is shown in FIG. 6B and includes a plurality of tiles 620. Each tile has a page height $H_p$ and page width $W_p$ corresponding to the pixel grid of the image representing the page. The C-channel value for each tile 620 is populated using the scalar values of the language embedding vector. As an example, the BERT language model generates a 768 real value vector output for each token of the language embedding. For the first tile 620 (i.e. tile 0), each pixel within each of the bounding boxes 602, 604, and 606 has its greyscale pixel value replaced with a scalar value corresponding to the first element 0 of the language embedding for the token associated with the bounding box. Similarly, for the second tile 1, each pixel within each of the bounding boxes 602, 604, and 606 has its greyscale pixel value replaced with a scalar value corresponding to the second element 1 of the language embedding for the token associated with the bounding box. The remaining tiles 2-767 are similarly populated with the scalar language embedding values. Directly encoding tokens in each bounding box using a single scalar value from the language embedding vector rather than by a granular collection of grayscale pixels, facilitates analysis of the mapping output 112 by the citation classifier 114. Information such as the font size and font formatting is implicitly encoded in the channel C, since tokens having a larger font size would necessarily occupy more pixels. Furthermore, the group pixels from the original image that would have a number of different greyscale values is now mapped as a single scalar value. This has the effect of significantly down-sampling the mapping output 112 representation without losing any information. The mapping output 112 of the token mapper 108 provides an associated between the language embedding for text in the regulatory content and the corresponding portion of the page image where the text appears. The mapping output 112 thus represents contextual information in the form of the language embedding channel C and also represents visual features of the tokens.

Figure 7A:
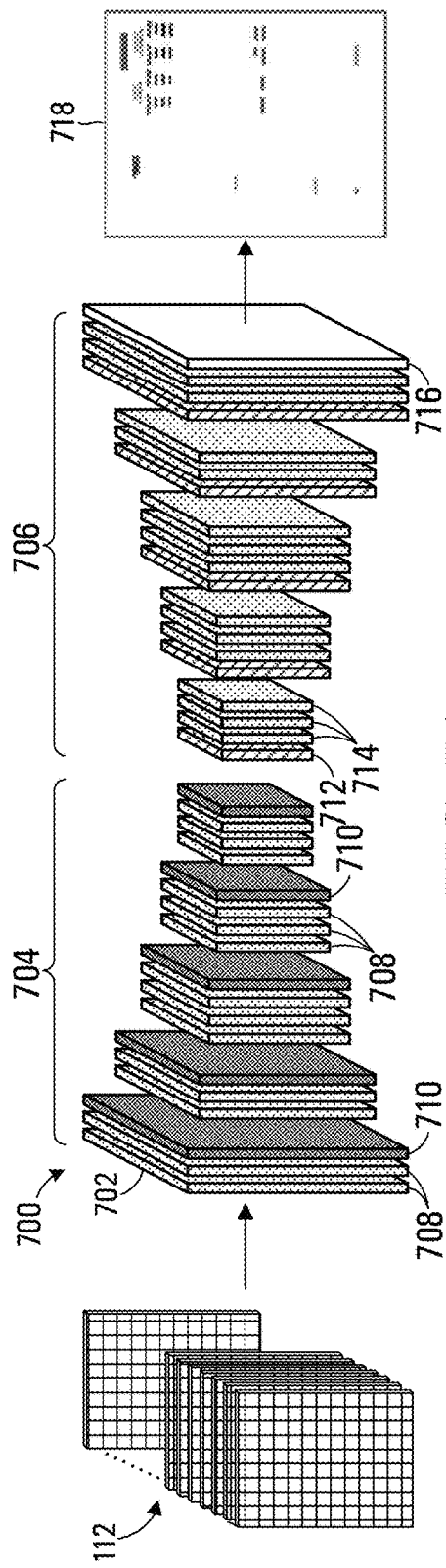
FIG. 7A is an embodiment of a deep convolutional neural network (CNN) for implementing a citation classifier of the system shown in FIG. 1.

In one embodiment the citation classifier 114 may be implemented using a deep convolutional neural network (CNN), an example of which is shown in FIG. 7A at 700. In one embodiment the CNN 700 may be implemented using a U-net architecture, which has a contracting path 704 and an expansive path 706 making the network architecture U-shaped. The contracting path 704 is a typical convolutional network that consists of repeated application of convolutions 708 that also perform batch normalization and rectified linear unit (ReLU). The convolutions 708 are followed by a max pooling layer 710. During the contraction, the spatial information in the mapping output 112 is reduced while feature information is increased. The expansive path 706 combines the features and spatial information through a sequence of up-convolutions 712 and concatenations 714 with high-resolution features from the contracting path 704. A final layer 716 may be configured as a SoftMax layer, which maps the non-normalized output of the prior layer to a probability distribution for the various output classifications. For example, the final layer 716 may identify tokens in each of the bounding boxes as having a class of "citation number", "citation title", or "body text". A "citation number" classification would generally be applied in cases where the citation includes numeric or other characters that indicate a sequence. A "citation title" classification would generally be applied in cases where the citation includes only alphabetical text characters. The "body text" classification is applied to indicate text that occurs following a "citation number" or "citation title" but is not part of the citation. The SoftMax function causes probabilities to be assigned to each of the above classifications such that the output probabilities add up to 1.0. The final layer 716 that provides the classification output 116 for the citation classifier 114 of FIG. 1. The final layer 716 thus distinguishes between citation tokens and tokens that are not citation tokens (i.e. body text).

Figure 8A:
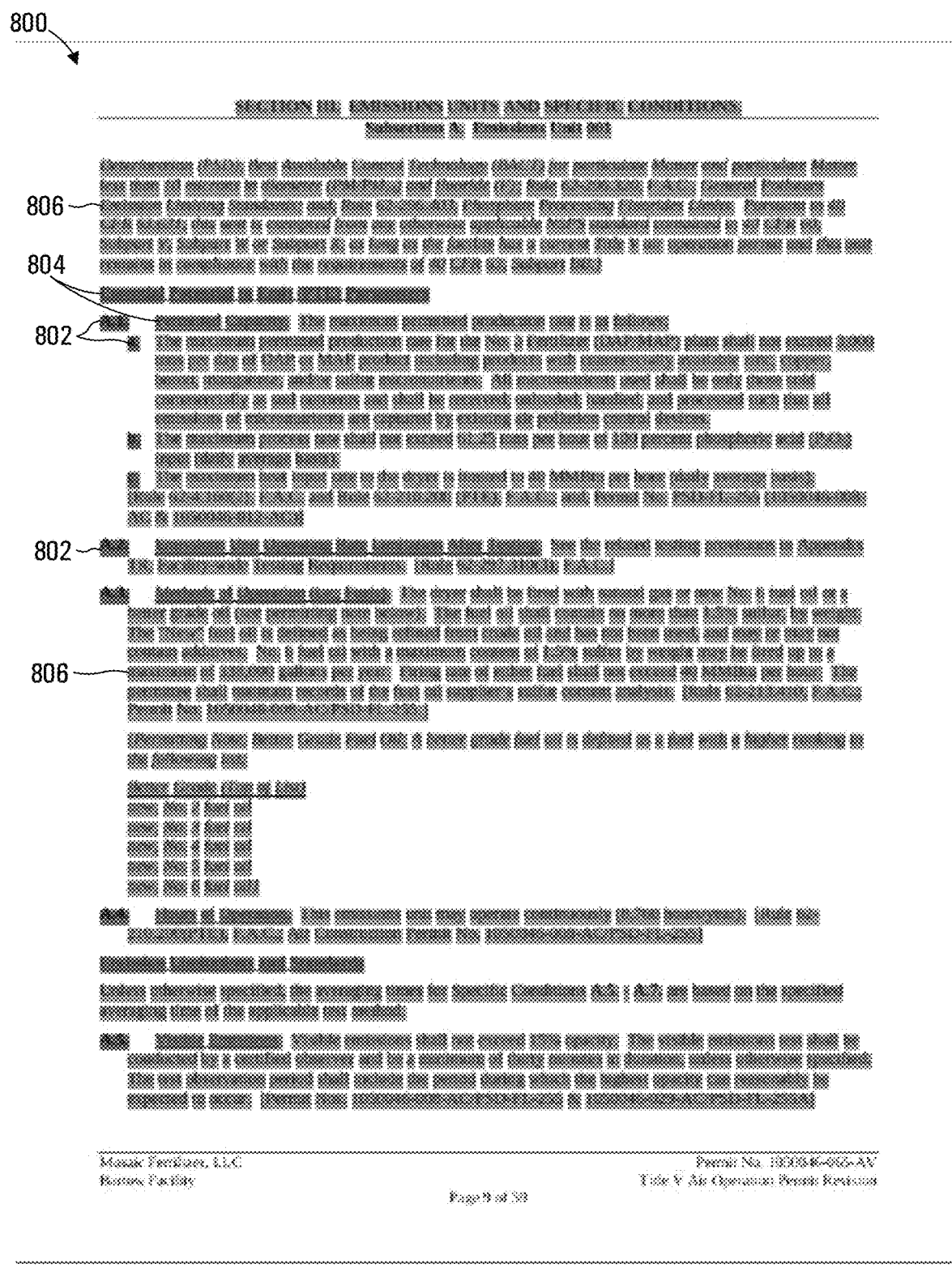
FIG. 8A is an example of a labelled training page image used for training the CNN shown in FIG. 7A.

U-net architecture networks were originally used to segment regular image data represented by a tensor (Wp, Hp, C) for each input image, where C is the depth of each pixel in the input image. In this embodiment, the C channel is replaced with the language embedding values in the mapping output 112, which provides the input to the CNN 700. The CNN 700 is initially trained on the training system 300 by providing training inputs to the CNN that have been labeled with a ground truth classification. A representation of a labeled training page image is shown in FIG. 8A at 800. The training page image 800 has been processed to identify bounding boxes and language embeddings as described above. However, in this case the training page image 800 has been further processed to assign classification labels to the bounding boxes, as indicated by the greyscale shading applied to the boxes. The bounding boxes 802 are labeled as "citation numbers", bounding boxes 804 as "citation title", and bounding boxes 806 as "body text". The labeling thus corresponds to the classifications at the final SoftMax layer 716 that the CNN 700 will be trained to generate on the training system 300. The effectivity of training may be enhanced by providing a relatively large number of labeled training page images 800 having different formats of citations and body text.

During training of the CNN 700, training page images 800 are forward propagated through the CNN to the final layer 716 which outputs a classification prediction 718 for each bounding box. The predictions are compared to the ground truth labels established for the training page images 800, and the weights $w_i$ and biases $b_i$ in the neurons of the layers of the CNN 700 are adjusted in proportion to how much each contributes to the overall error. The training of the CNN 700 is generally performed using library functions provided by machine learning environments such as Python, and PyTorch, or TensorFlow. Once the CNN 700 has been trained on a first portion of the training page images 800, a second portion of the training page images may be used for validation. When the operator is satisfied with the performance of the CNN 700, the configuration of the CNN, weights $w_i$ and biases $b_i$ are saved into the citation classifier configuration storage 256 in the data storage memory 206 of the inference processor circuit 200.

Figure 8B:
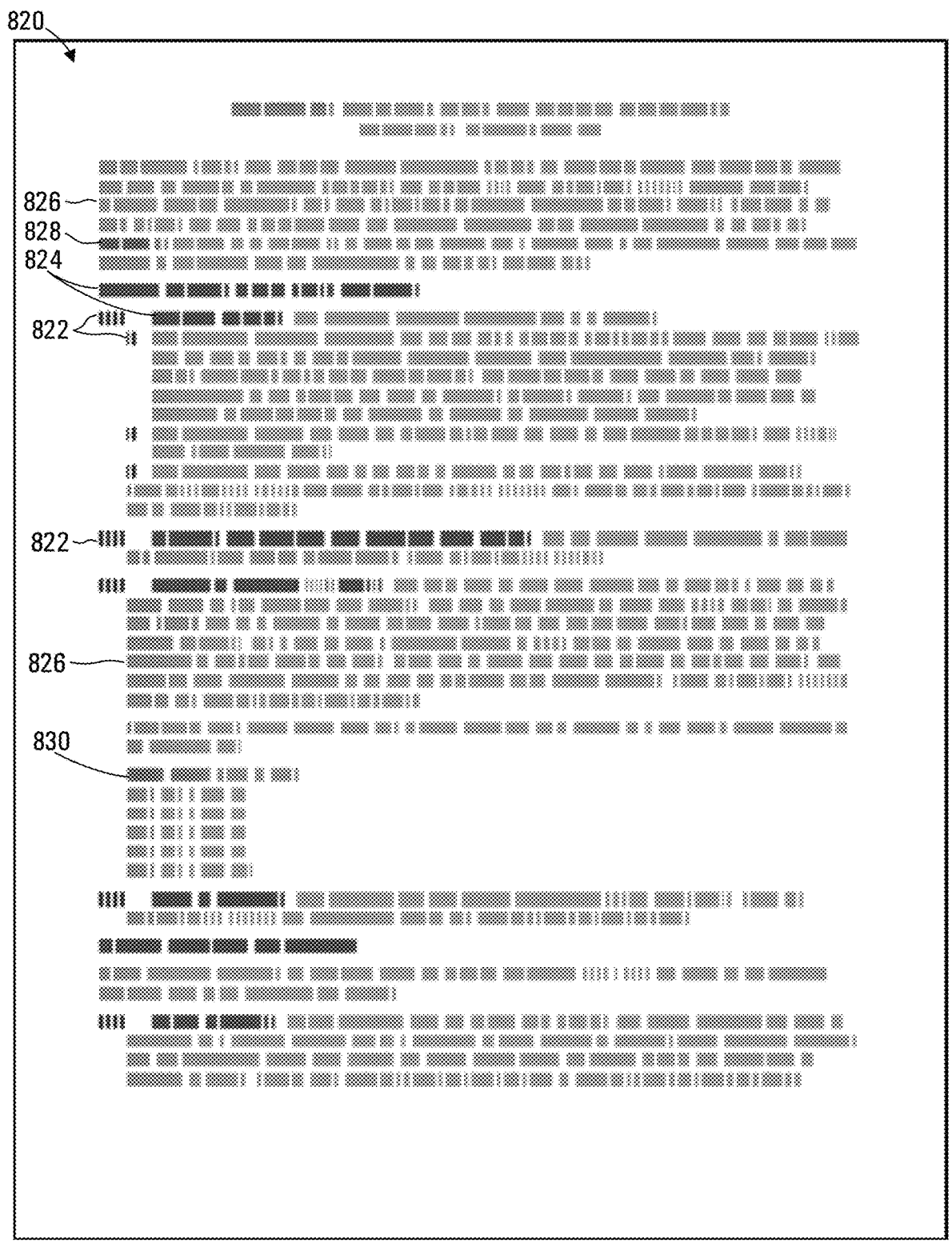
FIG. 8B is a representation of a classification output by the trained CNN shown in FIG. 7A.

A representation of a classification output by the final layer 716 of the CNN 700 is shown in FIG. 8B at 820. When compared to the training page image 800 of FIG. 8A, the output correctly predicts the classification for bounding boxes including citation numbers 822, citation title 824, and body text 826. However, the CNN 700 has incorrectly predicted that portion of body text 828 and 830 to have a classification of citation title. In most cases post-processing of the classification output 820 may resolve the incorrect classifications. In one embodiment post processing may involve assigning different thresholds for each classification. For example, if the probabilities assigned by the CNN 700 for "citation number", "citation title" and "body text" are 0.4, 0.35, and 0.25 respectively, it is not necessary to select the highest probability as the predicted classification. As an example, the threshold for "citation number" could be set to 0.5. Additionally or alternatively, since a word may be represented by more than one token, the probabilities assigned to the tokens may be combined on a majority vote basis to resolve the classification for the full word. For example, "(A)" may be tokenized as "(", "A", ")". If two of these tokens have correct classification assigned, the entire word (A), can be correctly classified. A "citation title" classification may also include multiple words and if the first and last word are classified correctly as "citation title", the remaining words may be corrected to have the correct classification by virtue of their occurring between two "citation tittle" words.

Figure 7B:
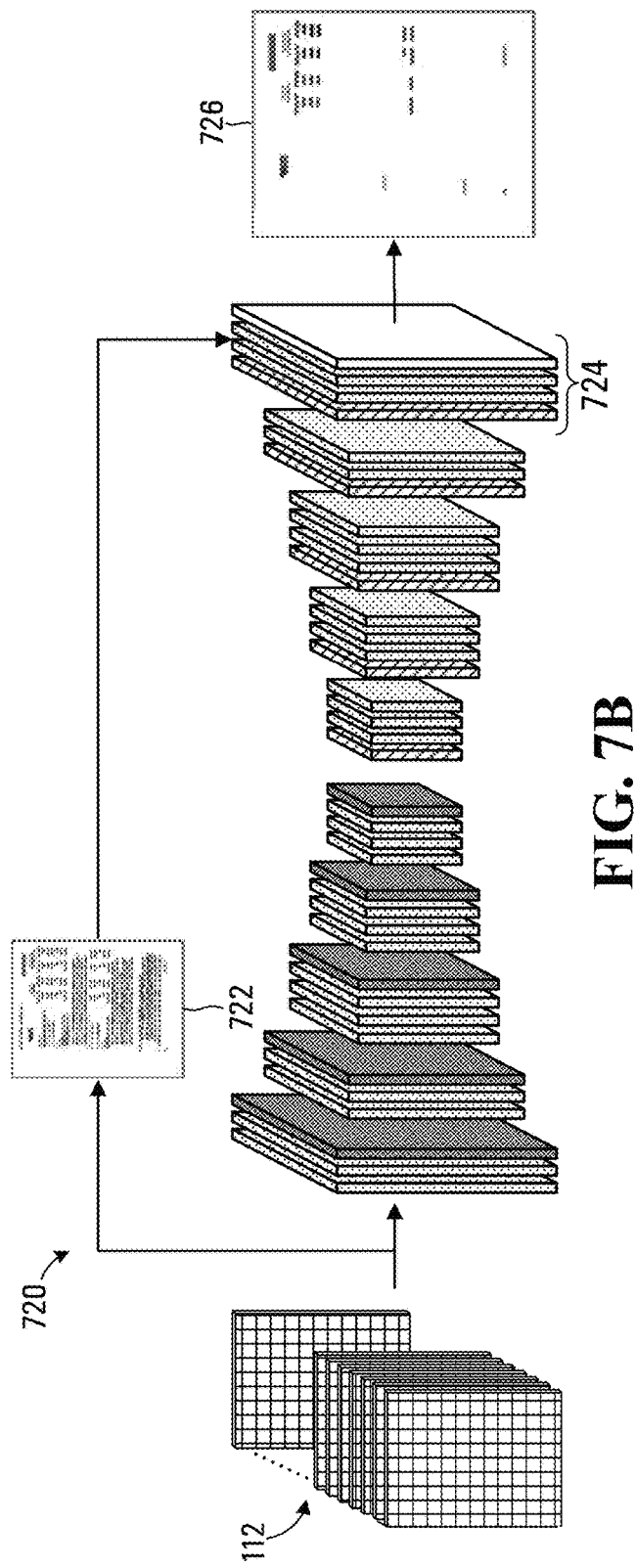
FIG. 7B is an alternative embodiment of a deep convolutional neural network (CNN) for implementing a citation classifier of the system shown in FIG. 1.

In the above CNN embodiment shown in FIG. 7A, the mapping output 112 of the token mapper 108 provides the input to the CNN 700 includes both spatial information from the page images of the regulatory content and the language embedding values 110 generated by the language model. In another embodiment shown in FIG. 7B, a CNN 720 may configured to receive and process the image data within the token mapping output 112, while a language embedding map 722 is concatenated with image features generated at the final layers 724 of the CNN to generate a classification prediction 726. The language embedding map is generated for each pixel inside the area of a word, by using the corresponding word embedding as the input. Pixels that belong to the same word thus share the same language embedding. Pixels that do not belong to any words will be filled with zero vector values. For a document image of size H×W, this process results in an embedding map of size N×H×W if the learned word embeddings are N-dimensional vectors (for example N=768 for the BERT language model). The language embedding map 722 is later concatenated with the feature response generated by the neural network along the channel dimensions.

Referring back to FIG. 1, the final layer 716 of the CNN 700 thus provides the classification output 116 in which text within each bounding box has a classification prediction. The classification output 116 thus facilitates identification of tokens in the regulatory content as citation numbers and citation title within the regulatory content pages from body text. At this stage however, the citation numbers and citation title have no established hierarchy. The classification output 116 is further processed by the hierarchical relationship classifier 118 to extract this hierarchical information.

Figure 9A:
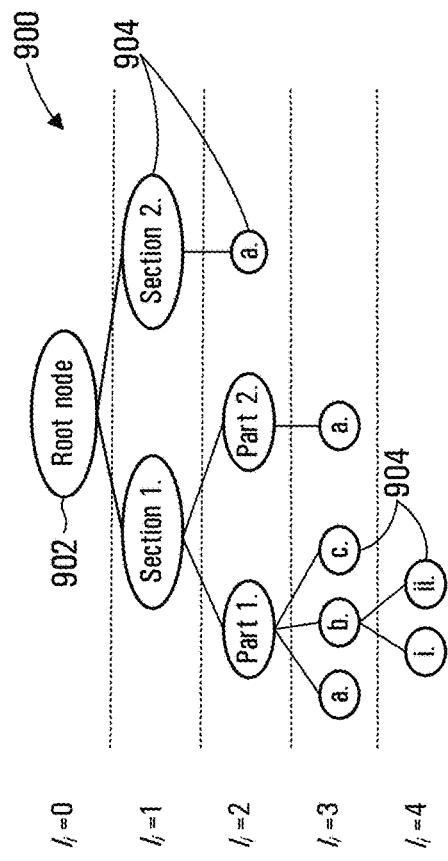
FIG. 9A is a schematic representation of a hierarchical tree structure generated by the hierarchical relationship classifier of the system shown in FIG. 1.

Hierarchical information may be extracted from the citation tokens by determining parent-child relationships between citation tokens to build a hierarchical tree of citations. An example of a hierarchical tree structure is shown in FIG. 9A at 900. A topmost node in the hierarchical tree 900 is referred to as the root node 902 and a plurality of nodes 904 stem from the root node in levels $l_i$=1 . . . 4. Every node 904 other than the root node 902, is connected to at least one other node. When moving up the tree structure, a node 904 that is connected to a node on a higher level $l_i$ is referred to as a child node. The node to which the child node is connected to is referred to as a parent node. Two nodes on the same level $l_i$ are referred to as siblings. The hierarchical relationship classifier 118 processes the classification output 116 to establish parent, child, and sibling relationships among nodes 904, 902, which facilitates construction of the hierarchical tree 900 for the regulatory content.

Figure 9B:
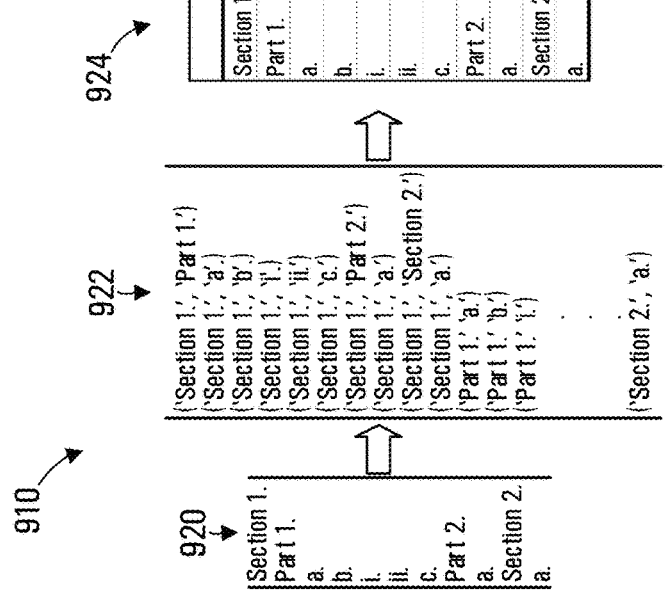
FIG. 9B is a representation of a data flows through the hierarchical relationship classifier of the system shown in FIG. 1.
Figure 10:
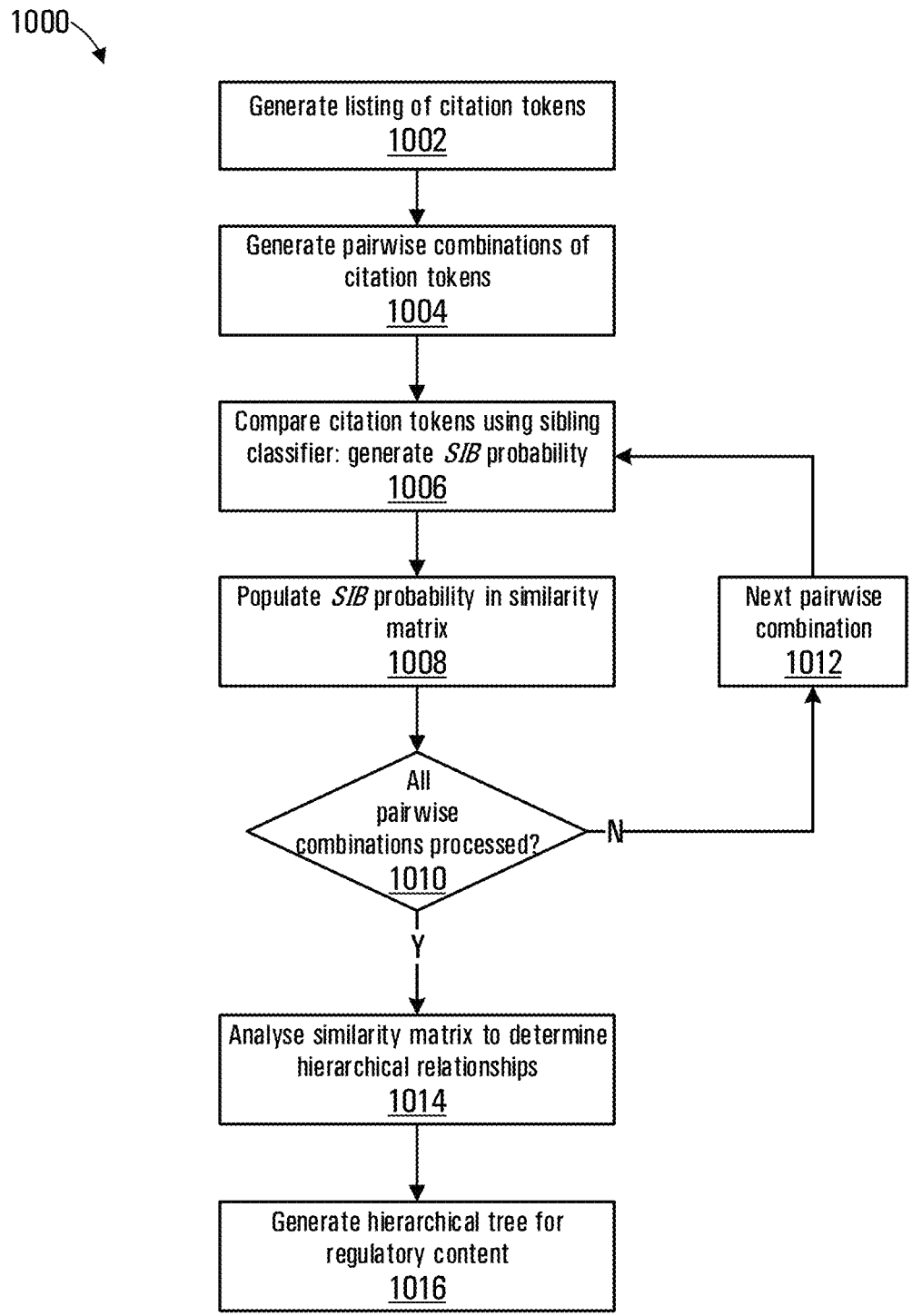
FIG. 10 is a process flowchart of a process for implementing the hierarchical relationship classifier on the inference processor circuit shown in FIG. 2.

Referring to FIG. 10, a process for implementing the hierarchical relationship classifier 118 to generate the hierarchical tree 900 on the inference processor circuit 200 is shown generally at 1000. The process begins at block 1002, which directs the microprocessor 202 of the processor circuit 200 to generate a list of citation tokens based on classification output 116 of the citation classifier 114. Referring to FIG. 9B, an example of a data flow within the hierarchical relationship classifier 118 is shown generally at 910. listing of citation tokens is shown at 920. The listing 920 includes a plurality of tokens that were classified as either citation numbers of citation title. Tokens classified as body text in the classification output 116 are not included in the listing 920.

Block 1004 of the process 1000 then directs the microprocessor 202 to construct pairwise combinations 922 including all possible pairs of citation tokens from the listing 920. In generating each pair of tokens in the pairwise combinations 922, a spatial information related to the location of the citation tokens is also embedded within the pairs. In one embodiment the pairwise combinations 922 may be encoded to include spatial information corresponding to the degree of indentation of the citation token on the page. For example, the spatial information may be added via a special token '<T>'. As an example, a pairwise combination 922 of citation tokens 'a.' and 'b.' may be encoded as (<T><T>'a.', <T><T><T>'b.'). The citation tokens citation tokens 'a.' and 'b.' thus have differing levels of indentation within the document, which may be an indication that while they share the same citation pattern, they may not actually be siblings.

Block 1006 then directs the microprocessor 202 to compare each of the pairs of citation tokens 922 to determine whether the tokens have a sibling relationship. In one embodiment the sibling classifier neural network may be implemented using a neural network that has been trained on the training system 300 using pairs of citation tokens that are labeled as being siblings or not siblings. The training pairs used to train the neural network include the level of indentation information indicated by the special token '<T>'. Incorporating this spatial information provides a more nuanced representation of the citation tokens for training the sibling classifier neural network. The sibling classifier neural network may be implemented using a language model, which has been configured to recognize the tabulation token <T> as part of its vocabulary. In one embodiment the language model neural network may be trained for the sibling classification function using a plurality of labeled pairs of sibling tokens and labeled pairs of non-sibling tokens.

The configuration of the sibling classifier neural network is stored in the location 258 of the data storage memory 206 of the inference processor circuit 200 for implementing the sibling classifier on the system 100. The sibling classifier neural network, when implemented on the inference processor circuit 200, thus receives a token pair from the pairwise combinations 922, an outputs a probability SIB indicating the likelihood of the pair being siblings.

In other embodiments, the comparison between siblings may be performed by a non-neural network implemented similarity function. For example, other classifiers such as support-vector machines (SVM), Naïve Bayes classifiers, k-nearest neighbors (k-NN) classifiers, etc, may be used to generate the sibling comparison. Features such as the indentation level of the token, font style, font size, and the word representation may be fed as feature inputs into these classifiers.

The process 1000 then continues at block 1008, which directs the microprocessor 202 to populate the probability SIB in a similarity matrix. An example of a similarity matrix is shown in a tabular format in FIG. 9B at 924. The rows and columns of the similarity matrix 924 both correspond to the citation token listing 920, which provides an entry in the matrix for each of the pairwise combinations 922. The diagonal elements of the similarity matrix 924 are all set to probability 1, since these elements represent the similarity between each citation token paired with itself (probability SIB is expressed as a number between 0 and 1). Once the SIB probability has been determined for a particular pairwise combination, the corresponding element is populated with the probability value. Block 1010 then directs the microprocessor 202 to determine whether all of the pairwise combinations 922 have been processed. If not, the microprocessor 202 is directed back via block 1012 to process the next pairwise combination. Once all pairwise combinations have been processed, block 1010 directs the microprocessor 202 to block 1014.

Block 1014 directs the microprocessor 202 to analyze the similarity matrix 924 to extract the parent, child, and sibling hierarchical information. The analysis process generally involves identifying sub-matrices within the similarity matrix 924 that are indicative of the hierarchy based on a threshold probability. In the example shown in FIG. 9B, the SIB probability threshold is set at 0.9. Starting on the first row "Section 1" and first column "Section 1.", the microprocessor 202 compares each of the SIB probabilities against the threshold. The SIB probability at the first row and column is 1, which defines the start of a first sub-matrix 926 (shaded light gray). Moving along the columns, the first sub-matrix 926 is then extended to the first SIB probability that is 0.9 or higher (i.e. "Section 2.=0.9" in this case). The first sub-matrix 926 is thus defined to include all the columns up to the "Section 2" column, and all rows down to the "Section 2" row. The first sub-matrix 926 this identifies "Section 1" and "Section 2" as being siblings at the same level li=1 of the tree 900 (FIG. 9A) under the root node 902.

The same process is repeated for the second row, where it is found that the first SIB probability that meets the threshold is at "Part 1.". This defines a second sub-matrix 928 (shown in a darker shade of gray), that identifies "Part 1" and "Part 2" as siblings on the level li=2 of the tree 900, under the "Section 1" parent. Similarly, for the third row of the similarity matrix 924, the citation tokens "a" and "b" are determined to be siblings under the parent "Part 1" at the level li=3 of the tree 900, based on the sub-matrix 930. The next sub-matrix 932 (shown in broken outline) identifies the citation token "b" and "c" as siblings, which places the citation token "c" on level li=3 with tokens "a" and "b". Sub-matrix 934, identifies "I" and "ii" as being siblings at level li=4, under parent "b".

Block 1016 directs the microprocessor 202 to generate the hierarchical tree 900 as described above, which defines the hierarchical connections between the citation tokens 922. Generally, text classified as being body text following a citation token up to the next citation token in the hierarchy may be associated with the citation token it follows for further process. The further processing may involve analyzing the body text under the citation and is not further described herein.

While specific embodiments have been described and illustrated, such embodiments should be considered illustrative only and not as limiting the disclosed embodiments as construed in accordance with the accompanying claims.

What is claimed is:

1. A computer-implemented method for identifying citations within regulatory content, the method comprising:
   receiving image data representing a format and layout of the regulatory content;
   receiving a language embedding including a plurality of tokens representing words or characters in the regulatory content;
   generating a token mapping associating each of the tokens with a portion of the image data;
   receiving the plurality of tokens and mapping at an input of a citation classifier, the citation classifier having been trained to generate a classification output for each token based on the language embedding and the token mapping, the classification output identifying a plurality of citation tokens within the plurality of tokens; and
   processing the plurality of citation tokens to determine a hierarchical relationship between citation tokens, the hierarchical relationship being established based at least in part on the token mapping for the citation tokens.

2. The method of claim 1 further comprising receiving text data representing characters in the regulatory content and generating the language embedding based on the received text data.

3. The method of claim 2 wherein generating the language embedding comprises generating the language embedding using a pretrained language model to process the text data, the pretrained language model being operably configured to generate the plurality of tokens.

4. The method of claim 1 wherein generating the token mapping comprises generating a tensor for each image page of regulatory content, the tensor having first and second dimensions corresponding to the image pixels in the image page and a third dimension in which language embedding values are associated with portions of the image page, the tensor providing the input to the citation classifier.

5. The method of claim 2 wherein generating the language embedding comprises:
   processing the image data to identify regions of interest within the regulatory content, each region of interest including a plurality of characters; and
   wherein generating the language embedding comprises generating the language embedding only for text data associated with the regions of interest.

6. The method of claim 5 wherein processing the image data to identify the plurality of regions of interest comprises receiving the image data at an input of a region of interest classifier, the region of interest classifier having been trained to identify regions within the image data that are associated with regulatory content that should not be processed to identify citation tokens.

7. The method of claim 6 wherein the region of interest classifier is pre-trained using a plurality of images of portions of the regulatory content that should not be processed to identify citation tokens.

8. The method of claim 1 wherein receiving image data comprises receiving text data including format data representing a layout of the regulatory content and generating an image data representation of the formatted text data.

9. The method of claim 1 wherein the image data comprises a plurality of page images and wherein generating the token mapping comprises:
   sizing each of the page images to match a common page size;

for each token, establishing a bounding box within the image that identifies a portion of the image corresponding to the token; and determining at least a bounding box location for each token, the bounding box location being indicative of an indentation or position of the token within the applicable page image.

10. The method of claim 9 further comprising processing the portion of the image within the bounding box to determine at least one of a font size associated with the token or a formatting associated with the token, and wherein the citation classifier is trained to generate the classification output based on at least one of the determined font size or formatting associated with the token.

11. The method of claim 1 wherein the citation classifier comprises a convolutional neural network.

12. The method of claim 1 wherein processing the plurality of citation tokens comprises receiving pairwise combinations of citation tokens at an input of a sibling classifier, the sibling classifier having been trained to output a probability indicative of whether each pairwise combination of citation tokens have a common hierarchical level.

13. The method of claim 12 further comprising generating a similarity matrix including a plurality of rows corresponding to the plurality of citation tokens and a plurality of columns corresponding to the citation tokens, the similarity matrix being populated with the probabilities determined by the sibling classifier for each pairwise combination of citation tokens, and further comprising processing the similarity matrix to generate a hierarchical level for each citation identifier token.

14. The method of claim 1 wherein the plurality of identified citation tokens each include either a citation number or citation title, and wherein a remaining plurality of tokens not identified as citation tokens include body text, and further comprising associating the body text between two consecutive citation tokens with the citation token.

15. A system for identifying citations within regulatory content, the system comprising:
   a token mapper operably configured to
      receive a language embedding including a plurality of tokens representing words or characters in the regulatory content;
      receive image data representing a format and layout of the regulatory content; and
      generate a token mapping associating each of the tokens with a portion of the image data;
   a citation classifier operably configured to receive the plurality of tokens and token mapping at an input of a citation classifier, the citation classifier having been trained to generate a classification output for each token based on the language embedding and the token mapping, the classification output identifying a plurality of citation tokens within the plurality of tokens; and
   a hierarchical relationship classifier operably configured to process the plurality of citation tokens to determine a hierarchical relationship between citation tokens, the hierarchical relationship being established based at least in part on the token mapping for the citation tokens.

16. The system of claim 15 wherein the system comprises one or more processor circuits having a memory for storing codes, the codes being operable to direct the processor circuit to implement each of the token mapper, the citation classifier, and the hierarchical relationship classifier.

17. A computer-implemented method for identifying citations within regulatory content, the method comprising:
   receiving image data representing a format and layout of the regulatory content;
   receiving a language embedding including a plurality of tokens representing words or characters in the regulatory content;
   generating a token mapping associating each of the tokens with a portion of the image data;
   receiving the plurality of tokens and mapping at an input of a citation classifier comprising a convolutional neural network, the citation classifier having been trained to generate a classification output for each token based on the language embedding and the token mapping, the classification output identifying a plurality of citation tokens within the plurality of tokens; and
   processing the plurality of citation tokens to determine a hierarchical relationship between citation tokens, the hierarchical relationship being established based at least in part on the token mapping for the citation tokens.

* * * * *